United States Patent
Yu

(10) Patent No.: US 10,853,437 B2
(45) Date of Patent: Dec. 1, 2020

(54) METHOD AND APPARATUS FOR INVOKING APPLICATION PROGRAMMING INTERFACE

(71) Applicant: TENCENT TECHNOLOGY (SHENZHEN) COMPANY LIMITED, Shenzhen (CN)

(72) Inventor: Xiaoxiao Yu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 680 days.

(21) Appl. No.: 15/200,501

(22) Filed: Jul. 1, 2016

(65) Prior Publication Data

US 2016/0314219 A1    Oct. 27, 2016

Related U.S. Application Data

(63) Continuation of application No. PCT/CN2015/076063, filed on Apr. 8, 2015.

(30) Foreign Application Priority Data

Apr. 10, 2014   (CN) .......................... 2014 1 0142520

(51) Int. Cl.
G06F 16/955    (2019.01)
G06F 9/445    (2018.01)
(Continued)

(52) U.S. Cl.
CPC ............ *G06F 16/9566* (2019.01); *G06F 8/36* (2013.01); *G06F 9/44521* (2013.01); *G06F 9/547* (2013.01); *H04L 67/42* (2013.01)

(58) Field of Classification Search
CPC ........ G06F 16/9566; G06F 8/36; G06F 9/547; G06F 9/44521
See application file for complete search history.

(56) References Cited

U.S. PATENT DOCUMENTS 5,790,800 A      8/1998  Gauvin et al.
9,407,727 B1 *  8/2016  McCanne ............... H04L 67/42
(Continued)

FOREIGN PATENT DOCUMENTS

CN        1729454 A       2/2006
CN      102246146 A      11/2011
(Continued)

OTHER PUBLICATIONS

Matt West, Accessing the Device Camera with getUserMedia, published in 2013 by Matt West, all pages.*
(Continued)

*Primary Examiner* — Philip C Lee
(74) *Attorney, Agent, or Firm* — Anova Law Group, PLLC

(57) ABSTRACT

A method and an apparatus for invoking an application programming interface (API) are disclosed. The method includes: loading a prestored JS file to a webpage after loading of the webpage is completed; receiving an invoking request that is sent by the webpage by invoking the JS file; and invoking a corresponding API according to a JS URL. This solves a problem that an encoded URL in each webpage needs to be modified when an encoding rule of a URL in a specified format is changed, which is complicated in operation, wastes time, and is poor in compatibility with clients in different versions.

12 Claims, 5 Drawing Sheets

(51) Int. Cl.
*G06F 8/36* (2018.01)
*G06F 9/54* (2006.01)
*H04L 29/06* (2006.01)

(56) References Cited

U.S. PATENT DOCUMENTS

| | | | | |
|---|---|---|---|---|
| 2004/0268225 | A1* | 12/2004 | Walsh | G06F 16/957 715/234 |
| 2005/0015220 | A1 | 1/2005 | Ramchandi | |
| 2010/0107088 | A1* | 4/2010 | Hunt | G06Q 10/10 715/752 |
| 2010/0287567 | A1 | 11/2010 | Hauser | |
| 2013/0080994 | A1* | 3/2013 | Ise | G06F 8/30 717/106 |
| 2014/0201619 | A1* | 7/2014 | Mo | G06F 40/14 715/234 |
| 2014/0337424 | A1* | 11/2014 | Lee | H04L 63/0823 709/204 |

FOREIGN PATENT DOCUMENTS

| | | |
|---|---|---|
| CN | 102497453 A | 6/2012 |
| CN | 102779071 A | 11/2012 |
| CN | 102819451 A | 12/2012 |
| CN | 103049320 A | 4/2013 |
| CN | 103546498 A | 1/2014 |

OTHER PUBLICATIONS

Anant Narayanan, Hints argument & privacy concerns, published Jan. 18, 2012 by Anant Narayanan, pp. 1-2.*

The State Intellectual Property Office of the People's Republic of China (SIPO) Office Action 1 for 201410142520.6 dated Sep. 5, 2018 7 Pages (including translation).

The World Intellectual Property Organization (WIPO) International Search Report for PCT/CN2015/076063 dated Jul. 1, 2015 p. 1-3.

* cited by examiner

METHOD AND APPARATUS FOR INVOKING APPLICATION PROGRAMMING INTERFACE

CROSS-REFERENCES TO RELATED APPLICATIONS

This application is a continuation and claims priority of PCT/CN2015/076063 filed on Apr. 8, 2015, which claims priority of Chinese Patent Application No. 201410142520.6, filed on Apr. 10, 2014. The entire contents of the two applications are incorporated by reference herein.

FIELD OF THE TECHNOLOGY

Embodiments of the present invention relate to the field of information technologies, and in particular, to a method and an apparatus for invoking an application programming interface (API).

BACKGROUND OF THE DISCLOSURE

A webpage may perform operations of video uploading, picture uploading, information verification, and the like by invoking a client running in a mobile terminal. That is, the client may provide some APIs in advance to the webpage, and then the webpage implements, by invoking different APIs, functions, which are provided by the client, of opening a camera, locating, acquiring information about an address book, and the like.

In related technologies, each API provided by a client to a webpage has a uniform resource locator (URL) that corresponds to each API and is in a specified format, different APIs correspond to different URLs in specified formats, and the specified formats are agreed in advance by research personnel of the client. During specific implementation, research personnel of the webpage encode, into the webpage, the URL that is in the specified format and corresponds to the API provided by the client to the webpage, and after being loaded, the webpage invokes, by using the URL in the specified format, the API that is in the client and corresponds to the URL.

Because the URL in the specified format needs to be encoded into the webpage in advance, when an encoding rule of the URL in the specified format is changed, an encoded URL in each webpage needs to be modified, which is complicated in operation, wastes time, and is poor in compatibility with clients in different versions.

SUMMARY

In view of the above, embodiments of the present invention provide a method and an apparatus for invoking an API. The technical solutions are as follows:

According to one aspect, a method for invoking an API is provided, applied to a client, the client including a memory, one or more processors, and a program instruction that is stored in the memory and is executed by the one or more processors, and the method including: loading a webpage; loading a prestored script language JS (Java Script) file of the client to the webpage after loading of the webpage is completed, the JS file including JS URLs corresponding to different APIs provided by the client; receiving an invoking request that is sent by the webpage by invoking the JS file, the invoking request carrying a JS URL corresponding to an API needing to be invoked; and invoking the corresponding API according to the JS URL in the invoking request.

According to another aspect, an apparatus for invoking an API is provided, applied to a client, the client including: one or more processors; a memory; and one or more program modules stored in the memory and executed by the one or more processors, the one or more program modules including: a file loading module, configured to load a prestored script language JS file of the client to a webpage after loading of the webpage is completed, the JS file including JS URLs corresponding to different APIs provided by the client; a request receiving module, configured to receive an invoking request that is sent by the webpage by invoking the JS file, the invoking request carrying a JS URL corresponding to an API needing to be invoked; and an API invoking module, configured to invoke the corresponding API according to the JS URL.

According to yet another aspect, an apparatus for invoking an API is provided, applied to a webpage, the apparatus including: one or more processors; a memory; and one or more program modules stored in the memory and executed by the one or more processors, the one or more program modules comprising: a file receiving module, configured to: when a client loads the webpage, receive a script language JS file of the client loaded by the client to the webpage, the JS file being prestored in the client, and the JS file including JS URLs corresponding to different APIs provided by the client; and a request sending module, configured to send an invoking request to the client by invoking the JS file, the invoking request carrying a JS URL corresponding to an API needing to be invoked, so that the client invokes the corresponding API according to the JS URL.

The present disclosure achieves effects that the corresponding API can be invoked by using the JS URL in the JS file provided when the JS file is completed loading to the webpage, and an encoded URL in each webpage does not need to be modified when an encoding rule of a JS URL is changed, which simplifies operation, reduces time, and does not need to implement compatibility with clients in versions.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

In order to make the objectives, technical solutions, and advantages of the present disclosure more comprehensible, the implementation manners of the present disclosure are described in further detail below with reference to the accompanying drawings.

A terminal in the embodiments may be a smart phone, a tablet computer, an ebook reader, a moving picture experts group audio layer III (MP3) player, a moving picture experts group audio layer IV (MP4) player, a laptop portable computer, a desktop computer, or the like. A client is a client application running on a client terminal, and the terminal may acquire webpage information by using the client application. A webpage in the embodiments may be hosted on a webserver or a terminal. In the present disclosure, the terms client, client terminal, and terminal may be used interchangeably.

Figure 1:
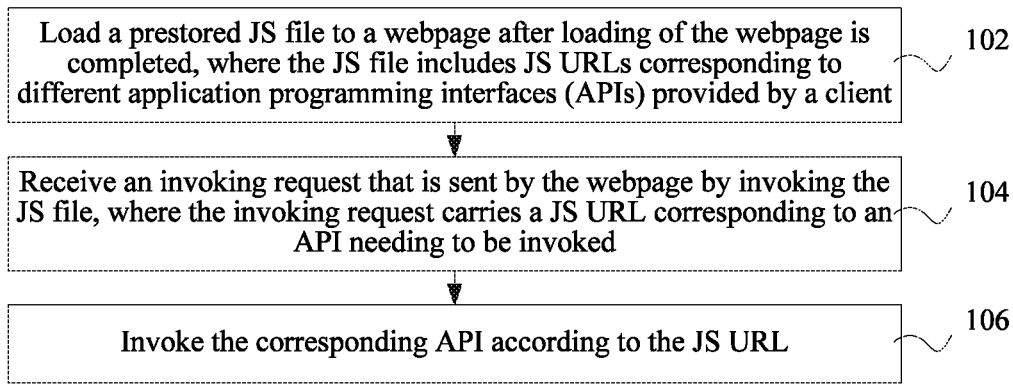
FIG. 1 is a flowchart of a method for invoking an API according to an embodiment of the present invention.

Referring to FIG. 1, FIG. 1 is a flowchart of a method for invoking an API according to an embodiment of the present invention. This embodiment is described by using an example in which the method for invoking an API is applied to a client. The method for invoking an API includes:

Step 102: Load a prestored JS (Java Script) file to a webpage after loading of the webpage is completed. The JS file includes JS URLs corresponding to different APIs provided by the client.

Step 104: Receive an invoking request that is sent by the webpage by invoking the JS file, where the invoking request carries a JS URL corresponding to an API needing to be invoked.

Step 106: Invoke the corresponding API according to the JS URL.

According to the method for invoking an API provided in this embodiment, a prestored JS file is loaded to a webpage after loading of the webpage is completed; an invoking request sent by the webpage by invoking the JS file is received; and a corresponding API is invoked according to a JS URL. This solves a problem that an encoded URL in each webpage needs to be modified when an encoding rule of a URL in a specified format is changed, which is complicated in operation, wastes time, and is poor in compatibility with clients in different versions. This further achieves effects that the corresponding API can be invoked by using the JS URL in the JS file provided that the JS file is loaded to the webpage when loading of the webpage is completed, and an encoded URL in each webpage does not need to be modified when an encoding rule of a JS URL is changed, which simplifies operation, reduces time, and does not need to implement compatibility with clients in versions.

Figure 2:
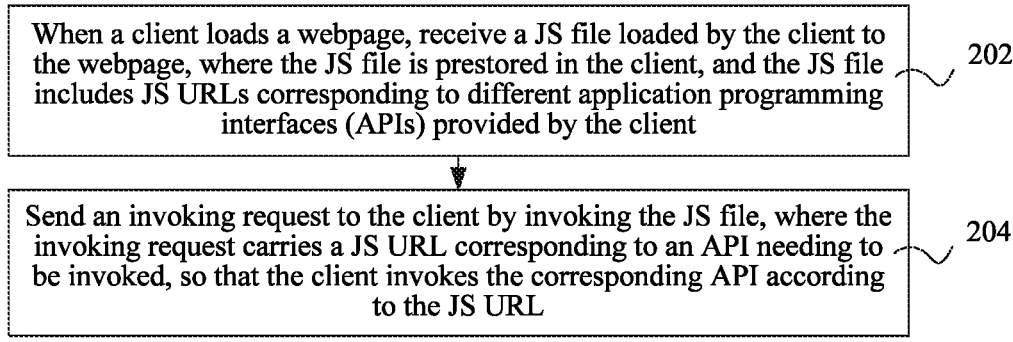
FIG. 2 is a flowchart of a method for invoking an API according to another embodiment of the present invention.

Referring to FIG. 2, FIG. 2 is a flowchart of a method for invoking an API according to an embodiment of the present invention. This embodiment is described by using an example in which the method for invoking an API is applied to a webpage. The method for invoking an API includes:

Step 202: When a client loads the webpage, receive a JS file loaded by the client to the webpage, where the JS file is prestored in the client, and the JS file includes JS URLs corresponding to different APIs provided by the client.

Step 204: Send an invoking request to the client by invoking the JS file, where the invoking request carries a JS URL corresponding to an API needing to be invoked, so that the client invokes the corresponding API according to the JS URL.

According to the method for invoking an API provided in this embodiment, a JS file loaded by a client to a webpage is received when the client loads the webpage, where the JS file is prestored in the client, and the JS file includes JS URLs corresponding to different APIs provided by the client; and an invoking request is sent to the client by invoking the JS file, where the invoking request carries a JS URL corresponding to an API needing to be invoked, so that the client invokes the corresponding API according to the JS URL. This solves a problem that an encoded URL in each webpage needs to be modified when an encoding rule of a URL in a specified format is changed, which is complicated in operation, wastes time, and is poor in compatibility with clients in different versions, and achieves effects that the corresponding API can be invoked by using the JS URL in the JS file provided that the JS file is loaded to the webpage when loading of the webpage is completed, and an encoded URL in each webpage does not need to be modified when an encoding rule of a JS URL is changed, which simplifies operation, reduces time, and does not need to implement compatibility with clients in versions.

Figure 3A:
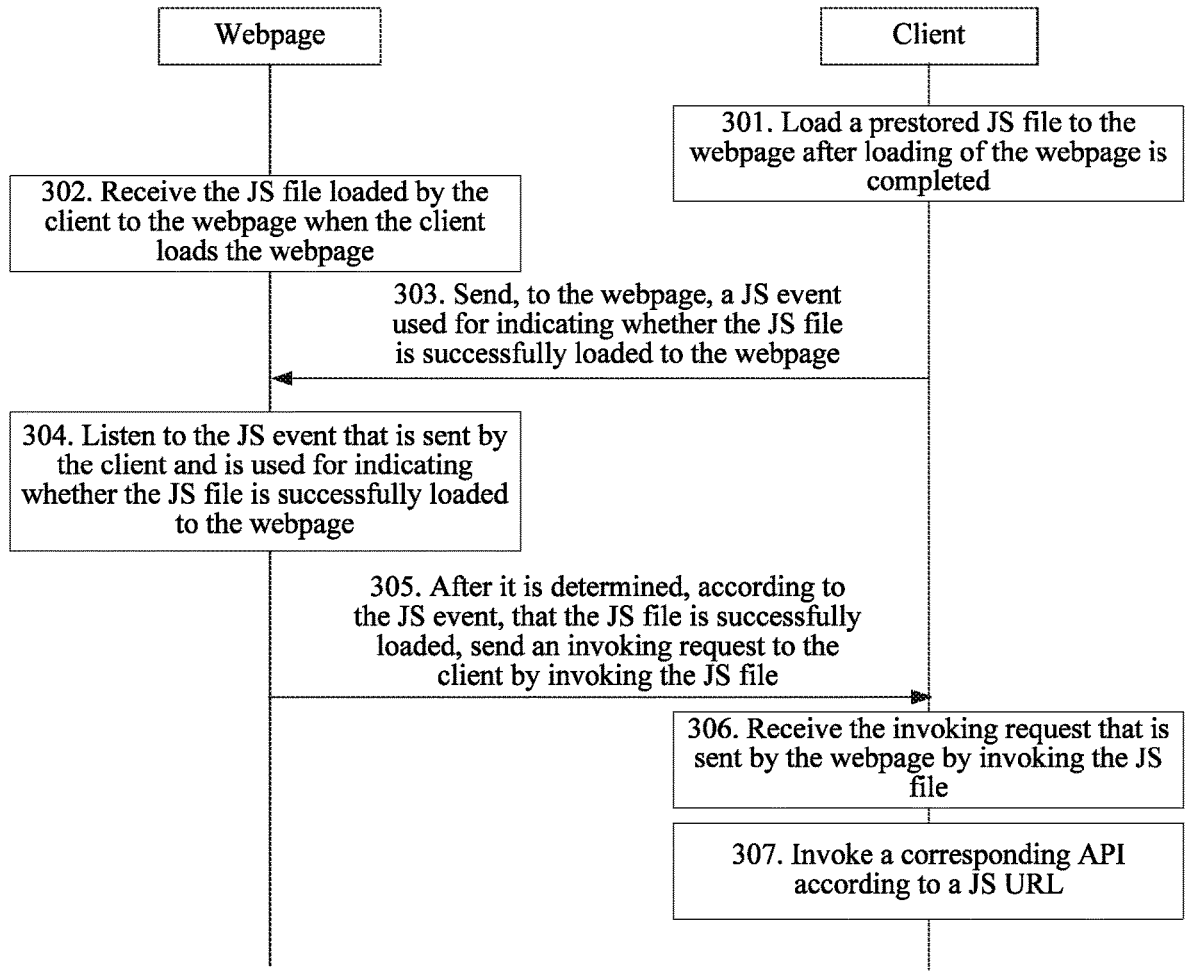
FIG. 3A is a flowchart of a method for invoking an API according to another embodiment of the present invention.

Referring to FIG. 3A, FIG. 3A is a flowchart of a method for invoking an API according to an embodiment of the present invention. The method for invoking an API includes:

Step 301: A client loads a prestored JS file to a webpage after loading of the webpage is completed. In some embodiments, the webpage may be loaded and stored in a webserver. In some embodiments, the webpage may be launched and stored in the client terminal, such as a lap top, a desktop computer, etc.

The JS file is prestored in the client, and the JS file includes JS URLs corresponding to different APIs provided by the client.

In order to invoke an API, a corresponding URL mapping is preset for the API, for example, a JSURL corresponding to an API for opening a camera of a user is defined as JSAPICall://opencamera?type=XX, where JSAPICall is a URL scheme of all such types of methods; opencamera is a path of the URL for opening a camera (URL path); type is a parameter, of which a value is rear/front, which respectively represents opening a rear-facing/front-facing camera; a URL for opening the rear-facing camera of the user is JSAPICall://opencamera?type=rear; and a URL for opening the front-facing camera of the user is JSAPICall://opencamera?type=front. Different APIs correspond to different JS URLs.

Step 302: When the client loads the webpage, the webpage receives the JS file loaded by the client to the webpage.

The JS file is prestored in the client, and the JS file includes JS URLs corresponding to different APIs provided by the client.

In one embodiment, only when loading the webpage, the client loads the JS file to the webpage, where a URL corresponding to an API does not need to be encoded into the webpage in advance.

Step 303: The client sends, to the webpage, a JS event used for indicating whether the JS file is successfully loaded to the webpage.

The client sends the JS event to the webpage, so that the webpage determines, by using the JS event, whether the JS file is successfully loaded.

Step 304: The webpage listens to the JS event that is sent by the client and is used for indicating whether the JS file is successfully loaded to the webpage.

Step 305: After it is determined, according to the JS event, that the JS file is successfully loaded, send an invoking request to the client by invoking the JS file.

The invoking request carries a JS URL corresponding to an API needing to be invoked, so that the client invokes the corresponding API according to the JS URL.

For example, the webpage sends, to the client, an invoking request for opening a user camera:

```
function openCamera(type){
    var url='JSAPICall://opencamera?type='+type;
    Window.location.href=url;
}
```

Step 306: The client receives the invoking request that is sent by the webpage by invoking the JS file.

The invoking request carries the JS URL corresponding to the API needing to be invoked.

Step 307: Invoke a corresponding API according to a JS URL.

Figure 3B:
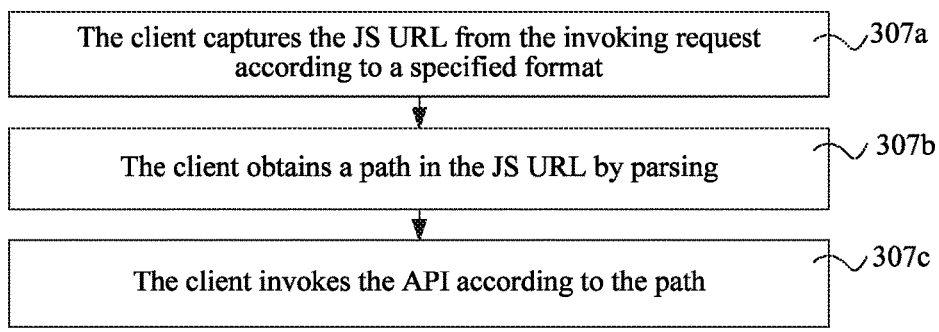
FIG. 3B is a flowchart of a method for invoking an API according to another embodiment of the present invention.

As shown in FIG. 3B, this step specifically includes the following substeps:

307a: The client captures the JS URL from the invoking request according to a specified format.

The client may capture the JS URL from the invoking request according to the specified format by using a built-in browser control. The specified format refers to a preset format, for example, if a preset format is a JS format, the client captures a URL in the JS format from the invoking request, that is, the JS URL in this embodiment.

For example, the client captures, in the invoking request, a JS URL: JSAPICall://opencamera?type=rear, of which a URL scheme is JSAPICall.

307b: The client obtains a path in the JS URL by parsing.

The path is used for locating the API corresponding to the JS URL. For example, "opencamera" in JSAPICall://opencamera? is a path.

307c: The client invokes the API according to the path.

For example, the client invokes a camera according to "opencamera".

It should be supplemented that, when the JS URL has a parameter, the client further needs to obtain the parameter in the JS URL by parsing, and further locate the API according to the parameter obtained by parsing, which is specifically as follows.

The client obtains a parameter in the JS URL by parsing, where the parameter is used for performing, when the API is invoked, an operation corresponding to the parameter.

For example, "rear" in JSAPICall://opencamera?type=rear is a parameter.

When the client obtains the path and parameter by parsing, the client invokes the API according to the path to perform the operation corresponding to the parameter. For example, the parameter "rear" in JSAPICall://opencamera?type=rear is used for invoking a rear-facing camera; a parameter "front" in JSAPICall://opencamera?type=front is used for invoking a front-facing camera.

According to the method for invoking an API provided in this embodiment, a prestored JS file is loaded to a webpage after loading of the webpage is completed; an invoking request sent by the webpage by invoking the JS file is received; and a corresponding API is invoked according to a JS URL. This solves a problem that an encoded URL in each webpage needs to be modified when an encoding rule of a URL in a specified format is changed, which is complicated in operation, wastes time, and is poor in compatibility with clients in different versions, and achieves effects that the corresponding API can be invoked by using the JS URL in the JS file provided that the JS file is loaded to the webpage when loading of the webpage is completed, and an encoded URL in each webpage does not need to be modified when an encoding rule of a JS URL is changed, which simplifies operation, reduces time, and does not need to implement compatibility with clients in versions.

Figure 3C:
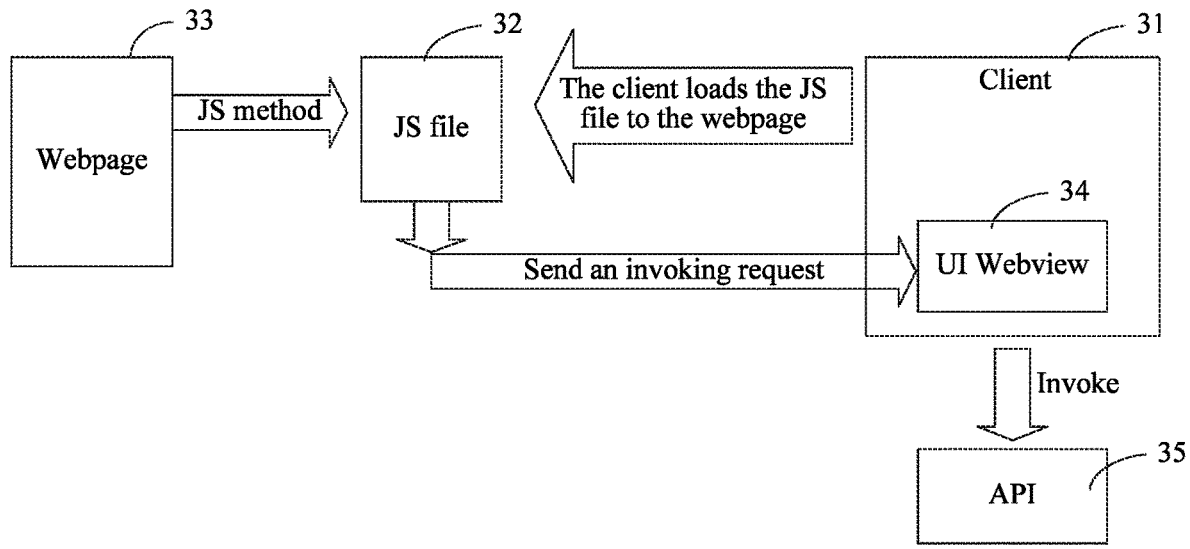
FIG. 3C is a flowchart of invocation of an API according to another embodiment of the present invention.

As shown in FIG. 3C, in a specific embodiment, steps of invoking an API by a webpage by using a client are as follows:

1. A client 31 loads a JS file 32 to a webpage 33 after completing loading of the webpage 33.
2. The client 31 sends a JS event to the webpage 33 after loading of the JS file is completed.
3. After it is detected, according to the received JS event by listening, that the JS file is successfully loaded, the webpage 33 sends an invoking request to the client 31 by using the JS file 32.
4. After receiving the invoking request, the client captures a URL in a specified format by using a UI Webview 34.
5. The client 31 parses the captured URL, to obtain a path and a parameter.
6. The client 31 invokes a corresponding API 35 according to the path and parameter that are obtained by parsing.

An apparatus embodiment of the present invention is described in the following, and for details that are not described at large, reference may be made to the corresponding method embodiments.

Figure 4:
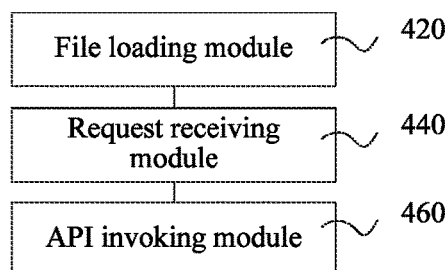
FIG. 4 is a structural block diagram of an apparatus for invoking an API according to an embodiment of the present invention.

Referring to FIG. 4, FIG. 4 is a schematic structural diagram of an apparatus for invoking an API according to an embodiment of the present invention. The apparatus for invoking an API may be implemented as all or a part of a client 400 by using software, hardware, or a combination thereof. The apparatus for invoking an API includes a file loading module 420, a request receiving module 440, and an API invoking module 460, where the file loading module 420 is configured to load a prestored JS file to a webpage after loading of the webpage is completed, where the JS file includes JS URLs corresponding to different APIs provided by the client; the request receiving module 440 is configured to receive an invoking request that is sent by the webpage by invoking the JS file loaded by the file loading module 420, where the invoking request carries a JS URL corresponding to an API needing to be invoked; and the API invoking module 460 is configured to invoke the corresponding API according to the JS URL received by the request receiving module 440. In some embodiments, the file loading module 420, the request receiving module 440, and the API invoking module 460 may include one or more computer programs that are stored in a memory and can be executed by one or more processors, such as the memory and the processor of the client terminal.

According to the apparatus for invoking an API provided in this embodiment, a prestored JS file is loaded to a webpage after loading of the webpage is completed; an invoking request sent by the webpage by invoking the JS file is received; and a corresponding API is invoked according to a JS URL. This solves a problem that an encoded URL in each webpage needs to be modified when an encoding rule of a URL in a specified format is changed, which is complicated in operation, wastes time, and is poor in compatibility with clients in different versions, and achieves effects that the corresponding API can be invoked by using the JS URL in the JS file provided that the JS file is loaded to the webpage when loading of the webpage is completed, and an encoded URL in each webpage does not need to be modified when an encoding rule of a JS URL is changed, which simplifies operation, reduces time, and does not need to implement compatibility with clients in versions.

Figure 5:
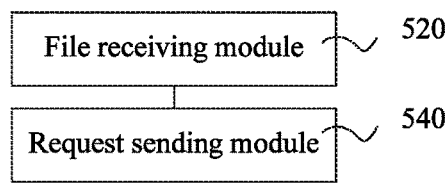
FIG. 5 is a structural block diagram of an apparatus for invoking an API according to another embodiment of the present invention.

Referring to FIG. 5, FIG. 5 is a schematic structural diagram of an apparatus for invoking an API according to an embodiment of the present invention. The apparatus for invoking an API may be implemented as all or a part of a webpage 500 by using software, hardware, or a combination thereof. The webpage may be stored on a wenserver or the client terminal. The apparatus for invoking an API includes: a file receiving module 520 and a request sending module 540. The file receiving module 520 may include one or more computer programs that are stored in a memory and can be executed by one or more processors, such as the memory or the processors of a client terminal or a server on which the webpage is launched or stored. The file receiving module 520, when executed by the processor may: when a client loads a webpage, receive a JS file loaded by the client to the webpage, where the JS file is prestored in the client, and the JS file includes JS URLs corresponding to different APIs provided by the client. The request sending module 540 may include one or more computer programs that are stored in a memory and can be executed by one or more processors, such as the memory or the processors of the client terminal or the wenserver on which the webpage is launched or stored. The request sending module 540 is configured to send an invoking request to the client by invoking the JS file received by the file receiving module 520, where the invoking request carries a JS URL corresponding to an API needing to be invoked, so that the client invokes the corresponding API according to the JS URL.

According to the apparatus for invoking an API provided in this embodiment, a JS file loaded by a client to a webpage is received when the client loads the webpage, where the JS file is prestored in the client, and the JS file includes JS URLs corresponding to different APIs provided by the client; and an invoking request is sent to the client by invoking the JS file, where the invoking request carries a JS URL corresponding to an API needing to be invoked, so that the client invokes the corresponding API according to the JS URL. This solves a problem that an encoded URL in each webpage needs to be modified when an encoding rule of a URL in a specified format is changed, which is complicated in operation, wastes time, and is poor in compatibility with clients in different versions, and achieves effects that the corresponding API can be invoked by using the JS URL in the JS file provided that the JS file is loaded to the webpage when loading of the webpage is completed, and an encoded URL in each webpage does not need to be modified when an encoding rule of a JS URL is changed, which simplifies operation, reduces time, and does not need to implement compatibility with clients in versions.

Figure 6:
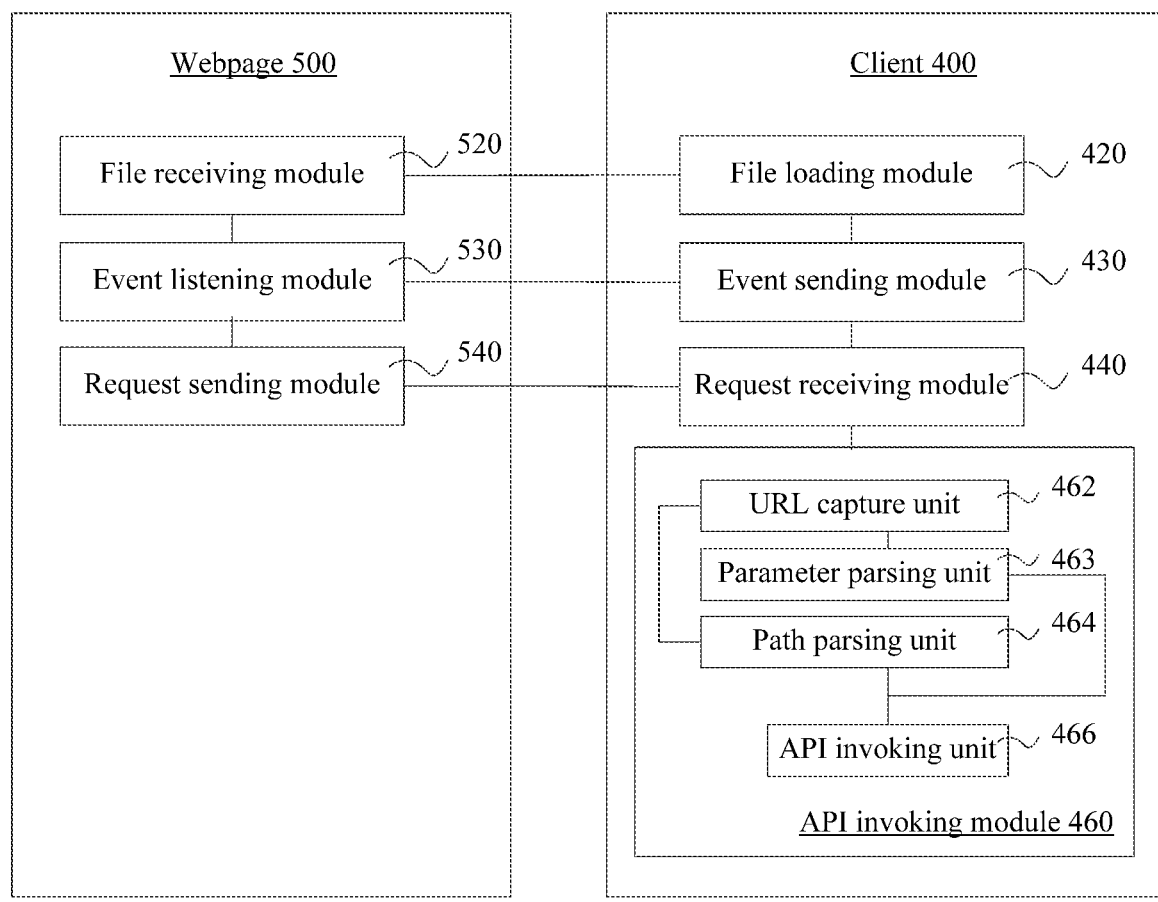
FIG. 6 is a structural block diagram of a system for invoking an API according to another embodiment of the present invention.

Referring to FIG. 6, FIG. 6 is a schematic structural diagram of a system for invoking an API according to an embodiment of the present invention. The system for invoking an API includes a client 400 and a webpage 500, where the client 400 is connected to the webpage 500 through a network. For example, the webpage 500 may be stored on a web server. The client 400 may be stored on a client terminal. The webserver and the client terminal are connected through a network.

The client 400 includes: a file loading module 420, a request receiving module 440, and an API invoking module 460, where the file loading module 420 is configured to load a prestored JS file to the webpage after loading of the webpage is completed, where the JS file includes JS URLs corresponding to different APIs provided by the client; the request receiving module 440 is configured to receive an invoking request that is sent by the webpage by invoking the JS file loaded by the file loading module 420, where the invoking request carries a JS URL corresponding to an API needing to be invoked; and the API invoking module 460 is configured to invoke the corresponding API according to the JS URL received by the request receiving module 440.

Further, the client 400 further includes: an event sending module 430, configured to send, to the webpage, a JS event used for indicating whether the JS file is successfully loaded to the webpage, so that after determining that the JS file is successfully loaded, the webpage sends the invoking request by invoking the JS file.

Further, the API invoking module 460 includes: a URL capture unit 462, a path parsing unit 464, and an API invoking unit 466. The URL capture unit 462 is configured to capture the JS URL from the invoking request according to a specified format. The path parsing unit 464 is configured to obtain, by parsing, a path in the JS URL captured by the URL capture unit 462, where the path is used for locating the API corresponding to the JS URL; and the API invoking unit 466 is configured to invoke the API according to the path obtained by parsing by the path parsing unit 464.

Further, the client 400 further includes: a parameter parsing unit 463, configured to obtain, by parsing, a parameter in the JS URL captured by the URL capture unit 462, where the parameter is used for performing, when the API is invoked, an operation corresponding to the parameter, where the API invoking unit 466 is further configured to invoke the API according to the path to perform the operation corresponding to the parameter obtained by parsing by the parameter parsing unit 463.

Further, the URL capture unit 462 is further configured to capture the JS URL from the invoking request according to the specified format by using a built-in browser control.

The event sending module 430, the parameter parsing unit 463, the API invoking unit 466, the path parsing unit 464, and the URL capture unit 462 may include one or more computer programs that are stored in a memory and can be executed by one or more processors, such as the memory and the processors of the client terminal. When executed by the processor, the one or more computer programs corresponding to event sending module 430, parsing unit 463, the API invoking unit 466, and the URL capture unit 462 may implement the functions as described in relation to FIG. 6.

The webpage 500 includes: a file receiving module 520 and a request sending module 540, where the file receiving module 520 is configured to: when the client loads the webpage, receive the JS file loaded by the client to the webpage, where the JS file is prestored in the client, and the JS file includes JS URLs corresponding to different APIs provided by the client; and the request sending module 540 is configured to send the invoking request to the client by invoking the JS file received by the file receiving module 520, where the invoking request carries the JS URL corresponding to the API needing to be invoked, so that the client invokes the corresponding API according to the JS URL.

Further, the webpage 500 further includes: an event listening module 530, configured to listen to the JS event that is sent by the client and is used for indicating whether the JS file is successfully loaded to the webpage, where the request sending module 540 is further configured to: after it is determined, according to the JS event, that the JS file is successfully loaded, perform the step of sending the invoking request to the client by invoking the JS file.

According to the apparatus for invoking an API provided in this embodiment, a prestored JS file is loaded to a webpage after loading of the webpage is completed; an invoking request sent by the webpage by invoking the JS file is received; and a corresponding API is invoked according to a JS URL. This solves a problem that an encoded URL in each webpage needs to be modified when an encoding rule of a URL in a specified format is changed, which is complicated in operation, wastes time, and is poor in compatibility with clients in different versions, and achieves effects that the corresponding API can be invoked by using the JS URL in the JS file provided that the JS file is loaded to the webpage when loading of the webpage is completed, and an encoded URL in each webpage does not need to be modified when an encoding rule of a JS URL is changed, which simplifies operation, reduces time, and does not need to implement compatibility with clients in versions.

Figure 7:
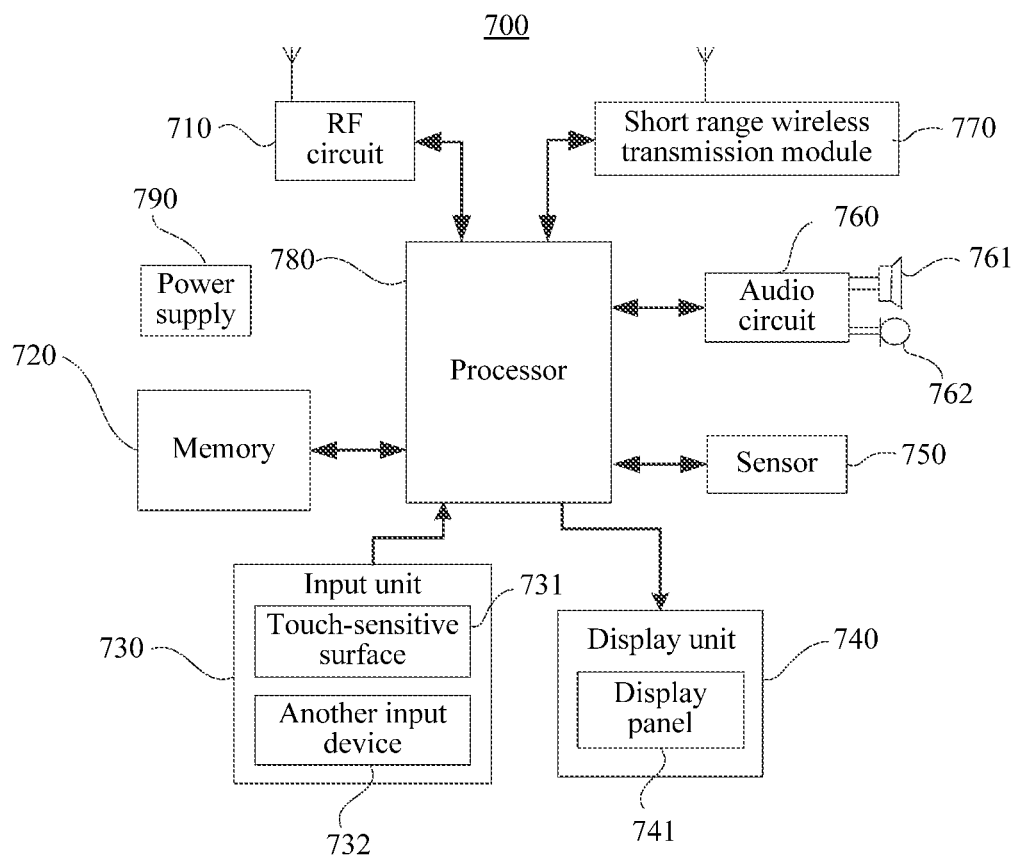
FIG. 7 is a schematic structural diagram of a terminal according to an embodiment of the present invention.

Referring to FIG. 7, FIG. 7 is a schematic structural diagram of a terminal according to an embodiment of the present invention. A client 400 or a client application is installed in the terminal 700, and the client is configured to implement the method for invoking an API provided in the foregoing embodiments.

The terminal 700 may include components such as a radio frequency (RF) circuit 710, a memory 720 including one or more computer readable storage media, an input unit 730, a display unit 740, a sensor 750, an audio circuit 760, a short range wireless transmission module 770, a processor 780 including one or more processing cores, and a power supply 790. A person skilled in the art may understand that the structure of the terminal shown in FIG. 7 does not constitute a limitation to the terminal, and the terminal may include more components or fewer components than those shown in the figure, or some components may be combined, or a different component deployment may be used.

The RF circuit 710 may be configured to receive and send a signal during an information receiving and sending process or a conversation process. Particularly, the RF circuit 710 receives downlink information from a base station, then delivers the downlink information to one or more processors 780 for processing, and sends related uplink data to the base station. Generally, the RF circuit 710 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 710 may also communicate with a network and another device through wireless communication. The wireless communication may use any communications standard or protocol, which includes, but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 720 may be configured to store a software program and module, for example, the memory 720 may be configured to store a preset time list, may further be configured to store a software program collecting a voice signal, a software program implementing keyword identification, a software program implementing continuous voice identification, and a software program implementing setting of reminders, and may further be configured to store a binding relationship between a wireless access point and a user account. The processor 780 runs the software program and module stored in the memory 720, to implement various functional applications and data processing. The memory 720 may mainly include a program storage area and a data storage area. The program storage area may store an operating system, an application program required by at least one function (such as a sound playback function and an image display function), and the like. The data storage area may store data (such as audio data and an address book) created according to use of the terminal 700, and the like. In addition, the memory 720 may include a high speed random access memory, and may also include a non-volatile memory, such as at least one magnetic disk storage device, a flash memory, or another volatile solid storage device. Accordingly, the memory 720 may further include a memory controller, so that the processor 780 and the input unit 730 access the memory 720.

The input unit 730 may be configured to receive input digit or character information, and generate keyboard, mouse, joystick, optical, or track ball signal input related to the user setting and function control. Specifically, the input unit 730 may include a touch-sensitive surface 731 and another input device 732. The touch-sensitive surface 731 may also be referred to as a touch screen or a touch panel, and may collect a touch operation of a user on or near the touch-sensitive surface (such as an operation of a user on or near the touch-sensitive surface 731 by using any suitable object or attachment, such as a finger or a touch pen), and drive a corresponding connection apparatus according to a preset program. Optionally, the touch-sensitive surface 731 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 780. Moreover, the touch controller can receive and execute a command sent from the processor 780. In addition, the touch-sensitive surface 731 may be a resistive, capacitive, infrared, or surface sound wave type touch-sensitive surface. In addition to the touch-sensitive surface 731, the input unit 730 may further include the another input device 732. Specifically, the another input device 732 may include, but is not limited to, one or more of a physical keyboard, a functional key (such as a volume control key or a switch key), a track ball, a mouse, and a joystick.

The display unit 740 may be configured to display information input by the user or information provided for the user, and various graphical user interfaces of the terminal 700. The graphical user interfaces may be formed by a graph, a text, an icon, a video, and any combination thereof. The display unit 740 may include a display panel 741. Optionally, the display panel 741 may be configured by using a liquid crystal display (LCD), an organic light-emitting diode (OLED), or the like. Further, the touch-sensitive surface 731 may cover the display panel 741. After detecting a touch operation on or near the touch-sensitive surface 731, the touch-sensitive surface 731 transfers the touch operation to the processor 780, so as to determine a type of the touch event. Then, the processor 780 provides corresponding visual output on the display panel 741 according to the type of the touch event. Although, in FIG. 7, the touch-sensitive surface 731 and the display panel 741 are used as two separate parts to implement input and output functions, in some embodiments, the touch-sensitive surface 731 and the display panel 741 may be integrated to implement the input and output functions.

The terminal 700 may further include at least one sensor 750, such as an optical sensor, a motion sensor, and other sensors. Specifically, the optical sensor may include an ambient light sensor and a proximity sensor. The ambient light sensor may adjust luminance of the display panel 741 according to brightness of the ambient light. The proximity sensor may switch off the display panel 741 and/or backlight when the terminal 700 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone gesture (such as switchover between horizontal and vertical screens, a related game, and gesture calibration of a magnetometer), a related function of vibration identification (such as a pedometer and a knock). Other sensor, such as a gyroscope, a barometer, a hygrometer, a thermometer, and an infrared sensor, which may be configured in the terminal 700 are not further described herein.

The audio circuit 760, a loudspeaker 761, and a microphone 762 may provide audio interfaces between the user and the terminal 700. The audio circuit 760 may convert received audio data into an electric signal and transmit the electric signal to the loudspeaker 761. The loudspeaker 761 converts the electric signal into a sound signal for output. On the other hand, the microphone 762 converts a collected sound signal into an electric signal. The audio circuit 160 receives the electric signal and converts the electric signal into audio data, and outputs the audio data to the processor 780 for processing. Then, the processor 780 sends the audio data to, for example, another terminal by using the RF circuit 710, or outputs the audio data to the memory 720 for further processing. The audio circuit 760 may further include an earplug jack, so as to provide communication between a peripheral earphone and the terminal 700.

The short range wireless transmission module 770 may be a wireless fidelity (WIFI) module, a Bluetooth module, or the like. The terminal 700 may help, by using the short range wireless transmission module 770, a user to receive and send an e-mail, browse a webpage, and access stream media, and the like, which provides wireless broadband Internet access for the user. Although FIG. 7 shows the short range wireless transmission module 770, it may be understood that, the short range wireless transmission module is not a necessary component of the terminal 700, and can be ignored as required as long as the scope of the essence of the present disclosure is not changed.

The processor 780 is a control center of the terminal 700, and connects to various parts of the terminal by using various interfaces and lines. By running or executing the software program and/or module stored in the memory 720, and invoking data stored in the memory 720, the processor 780 performs various functions and data processing of the terminal 700, thereby performing overall monitoring on the terminal. Optionally, the processor 780 may include one or more processing cores. Optionally, the processor 780 may integrate an application processor and a modem. The application processor mainly processes an operating system, a user interface, an application program, and the like. The modem mainly processes wireless communication. It may be understood that, the foregoing modem may also not be integrated into the processor 780.

The terminal 700 further includes the power supply 790 (such as a battery) for supplying power to the components. Preferably, the power supply may logically connect to the processor 780 by using a power supply management system, thereby implementing functions, such as charging, discharging, and power consumption management, by using the power supply management system. The power supply 790 may further include any component, such as one or more direct current or alternate current power supplies, a re-charging system, a power supply fault detection circuit, a power supply converter or an inverter, and a power supply state indicator.

Although not shown in the figure, the terminal 700 may further include a camera, a Bluetooth module, and the like, which are not further described herein.

The terminal 700 further includes a memory and one or more programs. The one or more programs are stored in the memory, and are configured to be executed by the one or more processors to perform the method for invoking an API according to any one of the foregoing embodiments.

In some embodiments, web servers are computers that deliver (serves up) webpages. Every Web server may have an IP address and possibly a domain name. Any computer, such as terminal 700, can be turned into a web server by installing server software and connecting the machine to the Internet. There are many Web server software applications, including public domain software and commercial packages, etc.

It should be supplemented that, in another embodiment, the terminal may include more components or fewer components than those shown in FIG. 7, or some components may be combined, or a different component deployment may be used, to implement all or some of the functions.

In addition, the method of the present disclosure may further be implemented by a computer program executed by the CPU, and the computer program may be stored in a computer readable storage medium. When the computer program is executed by the CPU, the functions defined in the method of the present disclosure are performed.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for invoking an application programming interface (API), applied to a client, the client comprising a memory, one or more processors, and program instructions that are stored in the memory and are executed by the one or more processors, and the method comprising:
    loading, by the client, a webpage hosted by a webserver;
    loading, by the client, a prestored script language JavaScript (JS) file of the client to the webpage after loading of the webpage is completed, the JS file comprising JS uniform resource locators (URLs) corresponding to a plurality of APIs provided by the client;
    receiving, by the client, an invoking request that is sent by the webpage by invoking the JS file, the invoking request carrying a JS URL corresponding to an API needing to be invoked; and
    identifying and invoking, by the client, the corresponding API according to the JS URL in the invoking request, comprising:

extracting the JS URL embedded within the invoking request according to a specified format, wherein the invoking request includes a call for a function to locate the API needing to be invoked, and the JS URL includes an identification of the API needing to be invoked among the plurality of APIs defined in the JS file;

obtaining a parameter in the JS URL by parsing, wherein the parameter is used for indicating a local hardware resource of the client on which an operation is to be performed when the API is invoked;

obtaining a path in the JS URL by parsing, wherein the path is used for locating the API for the to-be-performed operation corresponding to the JS URL; and invoking the API according to the path to perform the operation directed to the local hardware resource corresponding to the parameter.

2. The method according to claim 1, before the receiving an invoking request that is sent by the webpage by invoking the JS file, comprising:

sending, to the webpage, a JS event used for indicating whether the JS file is successfully loaded to the webpage, so that after determining that the JS file is successfully loaded, the webpage sends the invoking request by invoking the JS file.

3. The method according to claim 1, wherein the extracting the JS URL from the invoking request according to a specified format comprises:

extracting the JS URL from the invoking request according to the specified format by using a built-in browser control.

4. An apparatus for invoking an application programming interface (API), applied to a terminal, the terminal comprising:

one or more processors;

a memory; and one or more program modules stored in the memory and executed by the one or more processors, the one or more program modules comprising:

a file loading module, configured to load a prestored script language JavaScript (JS) file of the client to a webpage hosted by a webserver after loading of the webpage is completed, the JS file comprising JS uniform resource locators (URLs) corresponding to a plurality of APIs provided by the client;

a request receiving module, configured to receive an invoking request that is sent by the webpage by invoking the JS file, the invoking request carrying a JS URL corresponding to an API needing to be invoked; and an API invoking module, configured to identify and invoke the corresponding API according to the JS URL, comprising:

extracting the JS URL embedded within the invoking request according to a specified format, wherein the invoking request includes a call for a function to locate the API needing to be invoked, and the JS URL includes an identification of the API needing to be invoked among the plurality of APIs defined in the JS file;

obtaining a parameter in the JS URL by parsing, wherein the parameter is used for indicating a local hardware resource of the client on which an operation is to be performed when the API is invoked;

obtaining a path in the JS URL by parsing, wherein the path is used for locating the API for the to-be-performed operation corresponding to the JS URL; and invoking the API according to the path to perform the operation directed to the local hardware resource corresponding to the parameter.

5. The apparatus according to claim 4, further comprising:

an event sending module, configured to send, to the webpage, a JS event used for indicating whether the JS file is successfully loaded to the webpage, so that after determining that the JS file is successfully loaded, the webpage sends the invoking request by invoking the JS file.

6. The apparatus according to claim 4, wherein the API invoking module is further configured to extract the JS URL from the invoking request according to the specified format by using a built-in browser control.

7. A non-transitory computer readable storage medium storing computer program instructions that, when being executed by at least one processor of a client, cause the at least one processor to perform:

loading a webpage hosted by a webserver;

loading a prestored script language JavaScript (JS) file of the client to the webpage after loading of the webpage is completed, the JS file comprising JS uniform resource locators (URLs) corresponding to a plurality of APIs provided by the client;

receiving an invoking request that is sent by the webpage by invoking the JS file, the invoking request carrying a JS URL corresponding to an API needing to be invoked; and identifying and invoking the corresponding API according to the JS URL in the invoking request, comprising:

extracting the JS URL embedded within the invoking request according to a specified format, wherein the invoking request includes a call for a function to locate the API needing to be invoked, and the JS URL includes an identification of the API needing to be invoked among the plurality of APIs defined in the JS file;

obtaining a parameter in the JS URL by parsing, wherein the parameter is used for indicating a local hardware resource of the client on which an operation is to be performed when the API is invoked;

obtaining a path in the JS URL by parsing, wherein the path is used for locating the API for the to-be-performed operation corresponding to the JS URL; and invoking the API according to the path to perform the operation directed to the local hardware resource corresponding to the parameter.

8. The storage medium according to claim 7, wherein the computer program instructions further cause the at least one processor to perform:

sending, to the webpage, a JS event used for indicating whether the JS file is successfully loaded to the webpage, wherein the webpage sends the invoking request to the client by invoking the JS file after it is determined that the JS file is successfully loaded to the webpage.

9. The storage medium according to claim 7, wherein the extracting the JS URL from the invoking request according to a specified format comprises:

extracting the JS URL from the invoking request according to the specified format by using a built-in browser control.

10. The method according to claim 1, wherein the local hardware resource of the client is one of an input unit, a sensor, an audio circuit, and a communication circuit.

11. The method according to claim 1, wherein the local hardware resource of the client includes at least one of a rear-facing camera or a front-facing camera.

12. The method according to claim 11, wherein:
the path in the JS URL corresponds to an operation on a camera; and
a value of the parameter in the JS URL indicates a type of the camera, the type of the camera being selected from the front-facing camera and the rear-facing camera.

* * * * *